July 30, 1968 P. E. NAPOLITANO 3,394,590
HYDRAULIC SYSTEM AND LIQUID LEVEL SENSING MECHANISM THEREFOR
Filed June 1, 1966 3 Sheets-Sheet 1

INVENTOR
Pellegrino E. Napolitano

BY
Stevens, Davis, Miller & Mosher
ATTORNEYS

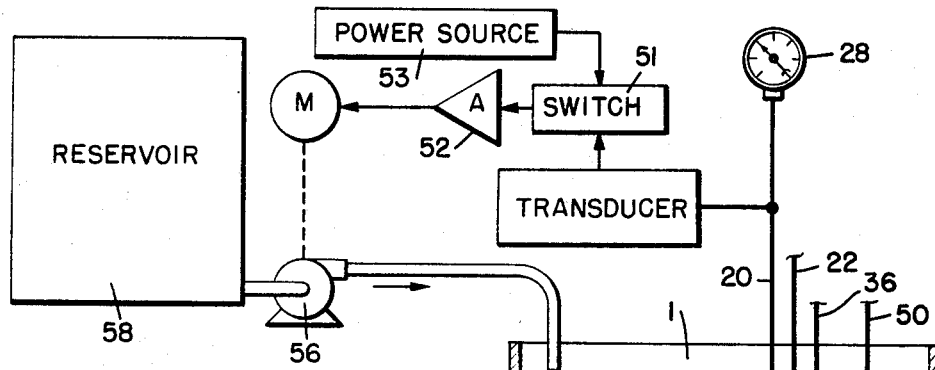
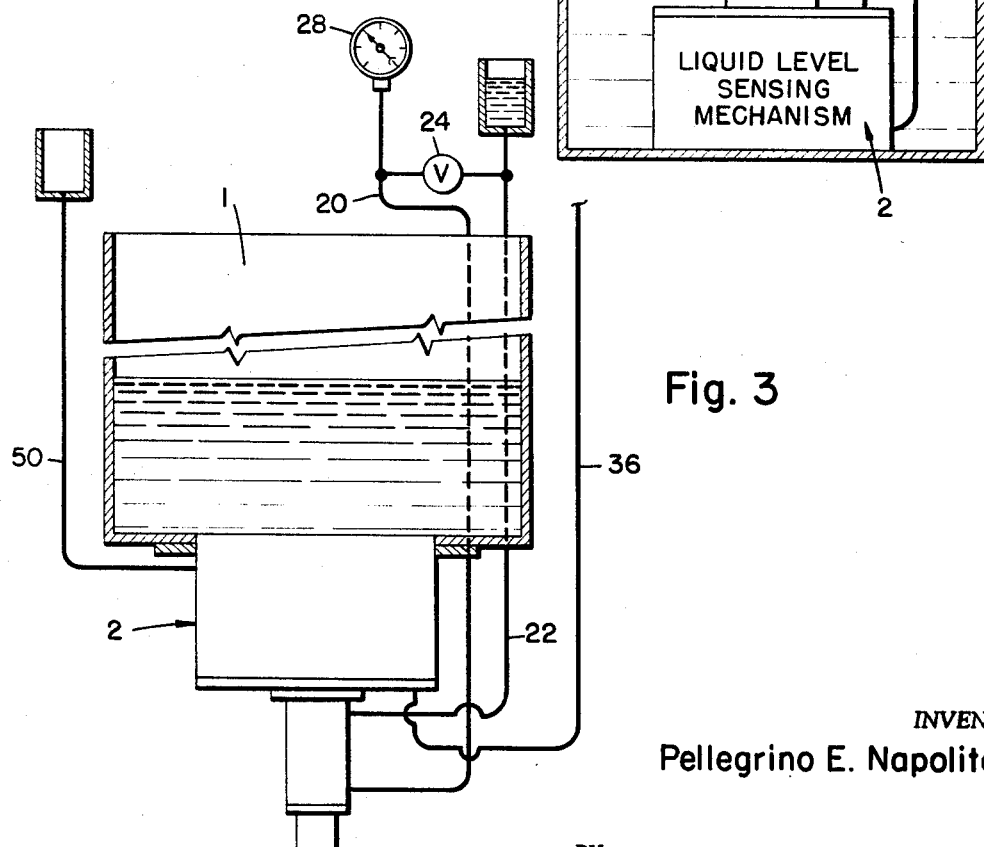

July 30, 1968  P. E. NAPOLITANO  3,394,590
HYDRAULIC SYSTEM AND LIQUID LEVEL SENSING MECHANISM THEREFOR
Filed June 1, 1966  3 Sheets-Sheet 3
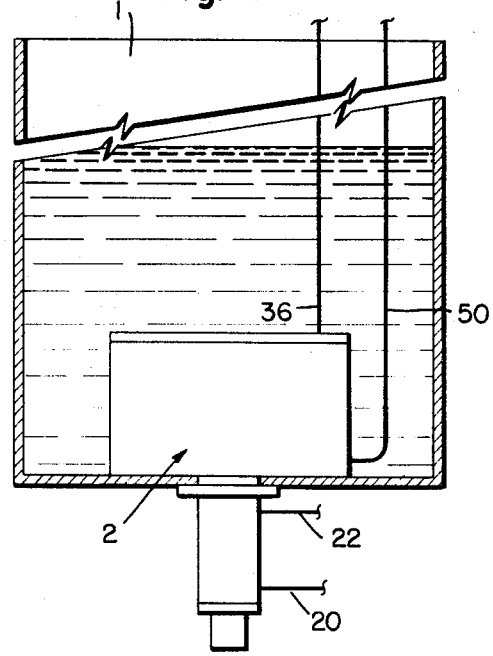
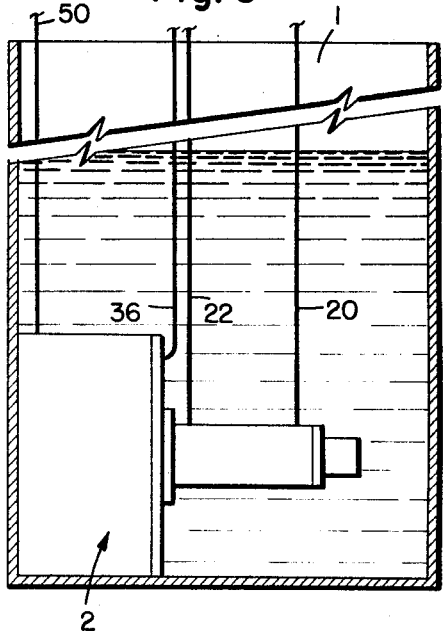
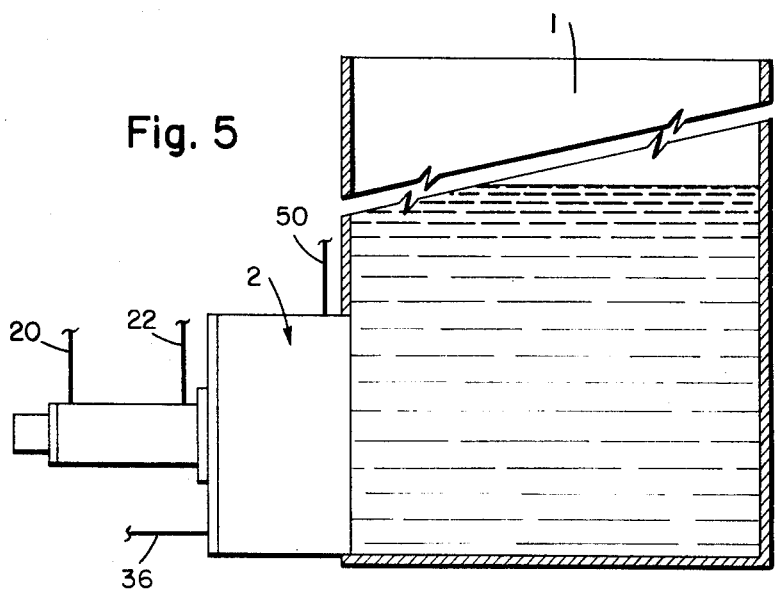
INVENTOR
Pellegrino E. Napolitano
BY *Stevens, Davis, Miller & Mosher*
ATTORNEYS United States Patent Office 3,394,590
Patented July 30, 1968

3,394,590
HYDRAULIC SYSTEM AND LIQUID LEVEL SENSING MECHANISM THEREFOR
Pellegrino E. Napolitano, Brooklyn, N.Y., assignor to Hudson Engineering Company, Hoboken, N.J., a corporation of New Jersey
Filed June 1, 1966, Ser. No. 554,544
12 Claims. (Cl. 73—299)

This invention relates to a hydraulic apparatus which is controlled by pressure signals developed by a liquid level sensing apparatus.

More particularly, this invention relates to a pressure responsive liquid level sensing apparatus that is highly sensitive and has special application toward accurately measuring levels of flammable liquids that are stored in tanks.

Other features of the present invention include its versatility of location and position. That is, the pressure sensing apparatus according to the present invention has equal facility and application toward shipboard use, i.e., liquid cargo tankers, as well as use with liquid storage tanks on shore. Further, the utilization device such as a gauge or control mechanism can be conveniently located remote from the tank or tanks containing the liquid without the need of recalibration due to a uniquely designed pressure balancing mechanism. The pressure sensing apparatus itself can be secured in any plane within the tank storing or carrying the liquid since it operates according to liquid pressures and is not dependent on other factors such as gravity.

Moreover, the apparatus according to this present invention is adaptable and useful with control systems and mechanisms that maintain liquids at a specified level or plurality of levels.

Many types of fluid systems include deep well tanks or reservoirs for the storage of liquid therein. It is necessary to periodically determine the liquid level in these tanks so that the proper steps toward emptying, refilling, etc. can be carried out.

One conventional method is a manual one whereby an operator standing over the tank unreels a weighted tape and takes a reading when the tape reaches the bottom of the tank. This manual method of measurement is not very accurate, particularly when a tank is aboard a ship and the liquid surface is in constant motion. Other disadvantages of the tape measurement include the amount of time necessary for a reading, the dangerous position assumed by the operator when measuring liquids in large tanks or measuring volatile liquids which emit noxious fumes.

In view of the general unsuitability of manual measuring techniques, automatic liquid level sensing devices were developed which included floats of various kinds which, through a series of levers, control appropriate dials and switches. But these floats tend to leak after a period of time resulting in inaccurate measurements. Also, the motion of the liquid within tanks mounted in ships normally bends or otherwise damages the mechanical system connected to the float.

These problems inspired development of sonar, photoelectric, and other electrical systems for sensing liquid levels in tanks. These electrical devices require expensive and specially designed equipment necessitating maintenance and periodic replacement of parts. The accuracy of these electrical systems is questionable because it has been found, especially in liquid cargo tankers, that the liquid in the tank often contains sludge, rust particles, and other foreign matter which when agitated cause the sonar or photoelectric device to give an inaccurate reading.

Electronic apparatus also require a power source which supplies voltage to at least one device located at the tank. This high voltage at the tank prevents the tank from being used to store liquids of a volatile nature because of the apparent danger of explosion or fire. Thus, tanks equipped with electronic devices are limited in the kinds of liquids they can store.

Therefore, there is a need for a liquid level sensing apparatus which is accurate, requires no electrical power or maintenance and therefore is suitable for measuring flammable or volatile liquids, and develops control signals which are fed to other apparatus of the system. Also, such a device should be able to sense the liquid level in stationary tanks as well as tanks mounted in ships.

The present invention satisfies this need and provides a mechanical liquid level sensing device located at the bottom of a liquid storage tank and which has an exceptionally high degree of accuracy.

Basically, the device according to the present invention comprises a piston and cylinder arrangement mounted near the bottom of the tank and provided with an opening so that part of the stored liquid enters the cylinder and forces the piston in an axial direction. A smaller piston and cylinder arrangement is located coaxial with the first piston and a connecting rod between the larger and the smaller piston moves the smaller piston in response to movement of the larger piston. Pressure multiplication is obtained due to the difference in piston dimensions. The movement of the smaller piston creates a pressure signal in the rear part of the smaller cylinder which signal is fed to a pressure gauge or pressure actuated switch for controlling other apparatus in the system. A balance line is provided which communicates with the lower part of the smaller cylinder and which is filled to the level of the gauge. An adjusting nut moves the connecting rod between the first and second piston until the gauge is set to zero. Once zero is set on the gauge, the device can be calibrated by filling an auxiliary calibration tube which makes it unnecessary to fill the tank for calibration purposes. The apparatus of the present invention can serve as the heart of many different types of liquid storage sensing systems, and, due to its increased sensitivity, it can detect slight variations in the liquid level and develop pressure control signals which are then used to control gauges and other apparatus.

It is a primary object of the present invention to provide a liquid level sensing device which accurately develops a pressure signal corresponding to the amount of liquid in a tank.

Another object of the present invention is to provide a liquid level sensing apparatus which can measure levels of any liquid and has special application and use for safely and accurately measuring levels of liquids that are flammable in nature.

A further object of the present invention is to provide a liquid level sensing apparatus which is highly accurate, easily calibrated, simple in construction and inexpensive to manufacture.

A still further object of the present invention is to provide a liquid level sensing apparatus that measures with equal facility liquid levels stored in a single or plurality of tanks located either on board a ship or on shore.

Still another object of the present invention is to provide a liquid level sensing apparatus which can be placed in any position or plane within the tank.

A still further object of the present invention is to provide a liquid level sensing apparatus wherein the indicator or other utilization device can be conveniently located remote from the tank or tanks containing the liquid.

It is yet another object of the present invention to provide a storage system with automatic refilling capabilities controlled by the liquid level sensing apparatus of the present invention.

Other objects of the present invention will become apparent with the following detailed description when taken in view of the accompanying drawings wherein:

FIG. 2 is a diagrammatic illustration of an automatic refilling storage tank system which is controlled by the liquid level sensing device of FIG. 1.

FIGS. 3, 4, 5 and 6 show side elevations of the invention of FIG. 1 located in different positions within the tank.

Figure 1:
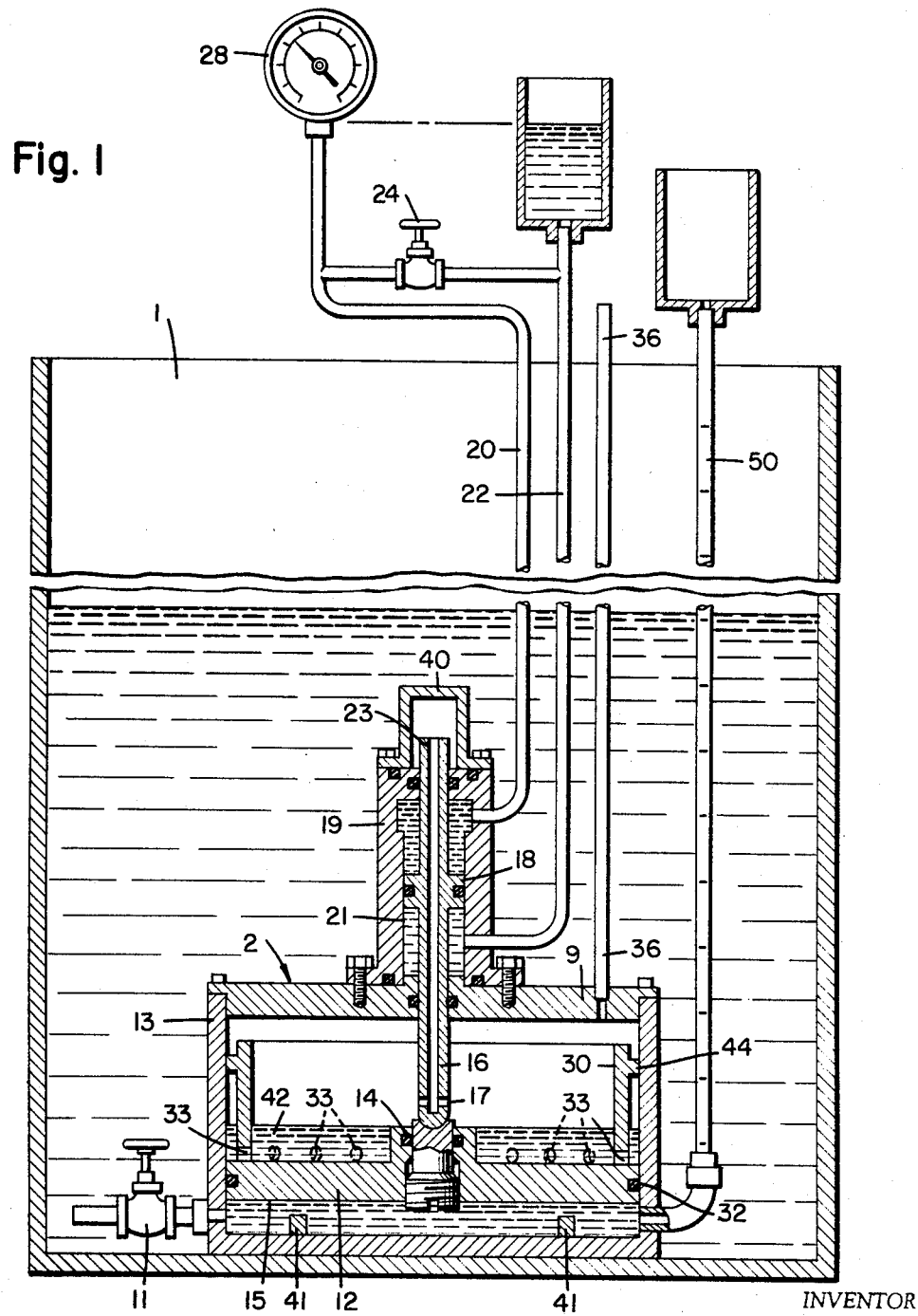
FIG. 1 is a vertical section of the present invention.

Referring to FIG. 1, the liquid pressure sensing mechanism of the invention, generally indicated by 2, is located within tank 1 such as used in liquid cargo tankers. A piston 12 having a relatively large surface area recessed within a surrounding deep flange 30 on its back face is movable within a fluid-tight cylinder 13 having a bottom secured in any suitable way to the bottom of tank 1. Cover plate 9 covers the rear of cylinder 13. A valve 11 is connected to cylinder 13 at a position near the bottom of tank 1 and feeds liquid to the lower face 15 of piston 12. Guide 44, which may be in the form of a ring or spaced protrusions, encircles the upper portion of flange 30 to reduce frictional contact between piston 12 and cylinder 13. A hollow rod or pipe 16 rests vertically on an adjusting screw 14 threaded into the center of piston 12. Stops 41 mounted to the bottom of cylinder 13 limit the downward travel of piston 12 and protect adjusting screw 14 from damage.

The back face of piston 12 is vented to the atmosphere by vent tube 36. Ports 33 are provided within piston 12 to lubricate the walls of cylinder 13 with lubricant 42. The end surface 23 of hollowed-out pipe 16 enclosed by cylinder head 40 is also vented to the atmosphere (by vent 36) through ports 17 located at the lower end of pipe 16.

A smaller piston 18 is formed as part of pipe 16 within a smaller cylinder 19 secured to the center of cover plate 9. Pistons 12 and 18 and cylinders 13 and 19 are coaxial. Although smaller piston 18 is shown as forming part of pipe 16, piston 18 can be a separate component and mounted to pipe 16. Cylinder head 40 forms an air-tight seal with the top of cylinder 19, and a suitable number of O-ring seals are provided to properly seal the pistons, cylinders and chambers. Gauge 28 hydraulically communicates via tube 20 with the upper part of cylinder 19 and is adjusted to zero by turning adjusting screw 14 until the zero position is reached.

In order for piston 18 to have the same pressure exerted on both upper and lower surfaces when the gauge is set at zero, a second tube 22, connected to the lower part of cylinder 19, is filled with liquid to the same height as gauge 28. Piston 18 is located in that part of cylinder 19 anywhere between the lower ends of tubes 20 and 22. Gauge 28 can be relocated at some convenient location remote from the tank with no problem of readjustment of the gauge because of the liquid pressure balancing feature provided by tube 22 on piston 18. That is, if after gauge 28 is set to zero it is decided to relocate the same, piston 18 would normally move (thus changing the zero setting of gauge 28) because the liquid column in tube 20 and the resulting pressure on piston 18 is changed. However, because an equal and opposite pressure is exerted on piston 18 by the liquid column in tube 22, piston 18 remains stationary and gauge 28 remains set at zero. The two tubes, 20 and 22, are connected via a valve 24. Valve 24, which is initially open, is closed after gauge 28 is set at zero, and both liquid columns in tubes 20 and 22 are at equal levels.

In order to calibrate the gauge, a calibrating tube 50 is employed. Calibration may be carried out without first filling tank 1 by simply closing shutoff valve 11 and gradually filling calibration tube 50 to various indices and marking off the corresponding points on gauge 28. An alternative method would be to fill the calibration tube to the maximum level of the tank, then gradually bleed out through valve 11 the liquid to the various levels indicated while marking off gauge 28. Tank 1 need not be filled beforehand, and, if the height of the tank is known, the gauge can be calibrated before the sensing mechanism is even placed within the tank. Tube 50 may be made of some transparent material such as glass with the calibration either printed or etched thereon. A metal tube having a plurality of spaced petcocks (not shown) corresponding to said markings on said glass tube might also be employed. Thus, by opening and closing the petcocks in sequence while filling or bleeding tube 50, calibration of gauge 28 is effected. The petcock arrangement for tube 50 is especially suitable for opaque liquids that tend to stick or adhere to the surfaces with which they come into contact.

The gauge, once calibrated, can be used for other liquids having different densities by simply substituting for the calibrated dial, conversion dials whose scales differ only by a density factor.

With the foregoing adjustment and calibrations, the liquid level indicator is now ready for operation. The sensing mechanism 2 is either secured in the tank containing the liquid to be measured, or the liquid to be measured is now poured in the tank containing the sensing mechanism. The liquid exerts a pressure on surface 15 of piston 12, and, because of the area differential between pistons 12 and 18, hydraulic pressure multiplication is effected to accurately and effectively communicate to gauge 28 via fluid conductor 20 even a slight variation in the level of the liquid. In one example of the embodiment herein described, an area ratio of 100:1 is employed between pistons 12 and 18, respectively. Thus, the sensing mechanism is sensitive even within as much as a few inches variation of the liquid level.

Referring to FIG. 2, a control system for automatically refilling tank 1 is controlled by the liquid level sensing mechanism 2 described above.

A pressure transducer located remote from tank 1 connects with the same line as gauge 28 and produces an electrical signal in response to the pressure sensed in liquid level sensing mechanism 2 described above. The electrical signal is fed to a switch, which opens when receiving signals above a fixed valve and closes when receiving signals below a fixed valve. Switch 51 feeds power from source 53 to amplifier 52 which energizes motor 54 to drive pump 56. Pump 56 draws liquid from reservoir 58 and delivers it to tank 1. It should be understood that this automatic system includes electrically operated components but they can be physically located away from source 58, tank 1 and the lines therebetween.

Referring to FIGS. 3 through 6, there is illustrated various operating positions of mechanism 2 within tank 1. Since the sensing apparatus is pressure responsive, the attitude that it might assume within tank 1 is independent of other external factors such as gravity.

FIGS. 3 and 4 show mechanism 2 within tank 1 positioned 180° from the position shown in FIG. 1. The positions shown in FIGS. 1, 3 and 4 are desirable when sensing the levels of liquids near the bottom of the tank. FIG. 3 affords an external installation of the indicator while FIG. 4 forms a hybrid installation with half internal and half external. In FIG. 4, the large cylinder is inverted so that large piston 12 still has surface 15 facing the bottom of tank 1.

FIGS. 5 and 6 show side installations of the sensing apparatus. FIG. 5 is a completely external installation, while FIG. 6 is an internal one.

In summary then, the present invention is able to accurately and safely measure the level of all types of liquids, including flammable liquids stored or carried in tanks. The apparatus employed includes a pressure sensing mechanism in the form of a large piston that is directly responsive to liquid pressure. The large piston transmits the pressure sensed to a further piston with a surface area smaller than the large piston thereby multiplying the force per unit area or pressure. The multiplied pressure is hydraulically fed to a pressure responsive utilization device that either indicates the liquid level directly or operates a control system to perform some further operation on the liquid stored or carried in said tanks.

While the above shows and describes the preferred embodiment of the invention, it is to be understood that various changes and modifications can be made herein without departing from the spirit and scope of the invention as claimed. An example of one such modification includes the substitution of diaphragm mechanisms for the pistons.

What is claimed is:

1. A liquid level sensing apparatus comprising, a first cylinder closed at each end thereof, a first member movable within and forming with said cylinder a first and second chamber, said first chamber of said first cylinder having an opening for receiving a liquid whose pressure is to be sensed by said first movable member as an indication of the level of said liquid in a container, a second cylinder smaller in cross-sectional area than said first cylinder and closed at least at one end thereof, a second member movable within and forming with said closed end of said second cylinder at least a first chamber containing a liquid, a connecting rod, each of said first and second movable members connected by said connecting rod, a utilization device, a first fluid conduit, said utilization device communicating with said liquid in said first chamber of said second cylinder via said fluid conduit whereby said utilization device receives a liquid pressure that is a hydraulic multiplication of the liquid pressure sensed by said first movable member and transmitted to said second movable member by said connecting rod.

2. The apparatus as claimed in claim 1 wherein said second cylinder is in coaxial relation and attached to one of said ends of said first cylinder, said second cylinder and said second movable member therein together with said one of said ends of said first cylinder forming a second chamber.

3. The apparatus as claimed in claim 2 wherein said second chamber in said second cylinder contains a fluid similar to said fluid in said first chamber of second cylinder, a second fluid conduit having substantially the same height as said first fluid conduit, said second conduit communicating with said fluid in said second chamber of said second cylinder for providing equal liquid pressures on opposed surfaces of said second movable member when there is no liquid pressure exerted on said first movable member.

4. The apparatus as claimed in claim 3 wherein said first cylinder is provided with a vent connecting said second chamber of said first cylinder to the atmosphere.

5. The apparatus as claimed in claim 4 wherein said closed end of said second cylinder comprises, a guide, said guide forming a fluid-tight seal with a portion of said connecting rod extending beyond said second movable member and through said guide, and a dome, said dome covering said connecting rod extending through said guide and forming together with said guide an air-tight chamber, said connecting rod being hollowed out so that said air-tight chamber communicates with said second chamber of said first cylinder.

6. The apparatus as claimed in claim 5 wherein said first and second movable members are each respectively first and second pistons.

7. The apparatus as claimed in claim 6 wherein said first piston and cylinder include means for lubricating the contacting surfaces thereof.

8. The apparatus as claimed in claim 1 wherein said utilization device includes a gauge responsive to said liquid pressure for measuring and indicating the level of said liquid.

9. The apparatus as claimed in claim 8 wherein said first movable member includes a concentrically located adjusting means in contiguous relation with said connecting rod for setting said gauge at a zero position.

10. The apparatus as claimed in claim 9 wherein a calibrating means is operatively attached to said first chamber of said first cylinder for calibrating said gauge.

11. The apparatus as claimed in claim 1 wherein said utilization device includes a transducing means responsive to said liquid pressure for responsively sensing a level change in said liquid by the generation of an energetic output corresponding to said change.

12. The apparatus as claimed in claim 11 including a liquid level control system comprising said liquid level sensing apparatus positioned in a tank filled to a predetermined point with liquid, said energy transducing means connected to a powered switch means for setting said predetermined point, a motor, a pump, said motor driving said pump in response to signals received from said transducer means and controlled by said powered switch means, a liquid source, said pump pumping liquid from said liquid source to said tank to maintain said liquid level at said predetermined point.

References Cited
UNITED STATES PATENTS

| | | | |
|---|---|---|---|
| 151,367 | 5/1874 | Eils | 73—406 |
| 2,144,020 | 1/1939 | Hunt. | |

DAVID SCHONBERG, *Primary Examiner.*